(12) United States Patent
Maeda et al.

(10) Patent No.: US 12,269,385 B2
(45) Date of Patent: Apr. 8, 2025

(54) SEAT BACK

(71) Applicant: TOYOTA BOSHOKU KABUSHIKI KAISHA, Aichi-ken (JP)

(72) Inventors: Michitaka Maeda, Aichi-ken (JP); Tsubasa Kuno, Aichi-ken (JP); Makoto Esaki, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 152 days.

(21) Appl. No.: 17/987,041

(22) Filed: Nov. 15, 2022

(65) Prior Publication Data

US 2023/0150411 A1 May 18, 2023

(30) Foreign Application Priority Data

Nov. 18, 2021 (JP) .................. 2021-187642

(51) Int. Cl.
*B60N 2/68* (2006.01)
*B60N 2/90* (2018.01)

(52) U.S. Cl.
CPC ............... *B60N 2/90* (2018.02); *B60N 2/686* (2013.01)

(58) Field of Classification Search
CPC .................................. B60N 2/686; B60N 2/90
USPC ....................................... 297/452.14, 452.18
See application file for complete search history.

(56) References Cited

U.S. PATENT DOCUMENTS

| | | | | | |
|---|---|---|---|---|---|
| 4,065,182 A | * | 12/1977 | Braniff | .................. | B60N 2/7005 297/440.22 |
| 5,522,645 A | * | 6/1996 | Dahlbacka | ............. | B60N 2/986 297/DIG. 2 |
| 5,895,096 A | * | 4/1999 | Massara | .................. | B60N 2/70 297/452.18 X |
| 5,918,943 A | * | 7/1999 | Mitschelen | ........... | B60R 21/207 297/452.18 X |
| 5,938,284 A | * | 8/1999 | Coffield | .................. | B60N 2/643 297/284.9 |
| 5,988,757 A | * | 11/1999 | Vishey | .................. | B60N 2/986 297/452.18 X |
| 6,019,428 A | * | 2/2000 | Coffield | .................. | B60N 2/986 297/284.9 |
| 6,048,033 A | * | 4/2000 | Sakurai | .................... | B60N 2/68 297/452.18 X |

(Continued)

FOREIGN PATENT DOCUMENTS

| | | | | | |
|---|---|---|---|---|---|
| DE | 102015203910 A1 | * | 9/2015 | .......... | B60N 2/5825 |
| JP | 2002-142913 | | 5/2002 | | |

(Continued)

OTHER PUBLICATIONS

Japanese Office Action issued in JP 2021-187642, dated Jan. 14, 2025, along with a machine English translation thereof.

*Primary Examiner* — Rodney B White

(74) *Attorney, Agent, or Firm* — Greenblum & Bernstein, P.L.C.

(57) ABSTRACT

A seat back includes a back board serving as a decorative plate on a rear side of the seat back, a back frame that is configured to support a seated person, a back pad that is disposed at a front side the back frame, is configured to supports the seated person, and has elasticity, an intermediate board that is interposed between a peripheral edge of the back pad and a peripheral edge of the back board, and a back cover that is disposed over the back pad and the intermediate board.

8 Claims, 13 Drawing Sheets

(56) References Cited

U.S. PATENT DOCUMENTS

| | | | | |
|---|---|---|---|---|
| 6,082,823 | A * | 7/2000 | Aumont | B60N 2/2222 |
| | | | | 297/452.18 X |
| 6,994,401 | B1 * | 2/2006 | Fischer | B60N 2/58 |
| | | | | 297/452.18 X |
| 7,559,607 | B2 * | 7/2009 | Archambault | B60N 2/99 |
| | | | | 297/284.6 |
| 8,465,092 | B2 * | 6/2013 | Kanda | B60N 2/42745 |
| | | | | 297/452.18 |
| 8,469,446 | B2 * | 6/2013 | Kanda | B60N 2/643 |
| | | | | 297/452.18 |
| 8,894,154 | B2 * | 11/2014 | Kulkarni | B29C 45/14467 |
| | | | | 297/452.18 X |
| 9,090,188 | B2 * | 7/2015 | Imamura | B60N 2/986 |
| 9,707,873 | B2 * | 7/2017 | Line | B60N 2/643 |
| 9,718,385 | B2 * | 8/2017 | Yasuda | B29C 44/0461 |
| 9,834,166 | B1 * | 12/2017 | Line | B60N 2/6009 |
| 9,845,032 | B1 * | 12/2017 | Line | B60N 2/6009 |
| 9,849,856 | B1 * | 12/2017 | Line | B60N 2/42745 |
| 9,868,374 | B2 * | 1/2018 | Ferguson | B60R 22/36 |
| 9,873,362 | B2 * | 1/2018 | Line | B60N 2/02246 |
| 10,046,682 | B2 * | 8/2018 | Line | B60N 2/643 |
| 10,071,661 | B2 * | 9/2018 | Ferguson | B64D 11/0647 |
| 10,220,745 | B2 * | 3/2019 | Line | B60N 2/64 |
| 10,220,750 | B2 * | 3/2019 | Line | B60N 2/64 |
| 10,272,800 | B2 * | 4/2019 | Whitmore | B60N 2/7035 |
| 10,300,818 | B2 * | 5/2019 | Kito | B60N 2/68 |
| 10,471,862 | B2 * | 11/2019 | Jones | B60N 2/6009 |
| 10,576,856 | B2 * | 3/2020 | Klap | B64D 11/0647 |
| 11,260,780 | B2 * | 3/2022 | Nagai | B60N 2/4214 |
| 11,285,853 | B1 * | 3/2022 | Line | B60N 2/7005 |
| 11,453,320 | B1 * | 9/2022 | Powell | B60N 2/803 |
| 11,787,320 | B2 * | 10/2023 | Gasko | B60N 2/686 |
| | | | | 297/452.18 |
| 11,850,981 | B2 * | 12/2023 | Seibold | B60N 2/525 |
| 2004/0183356 | A1 * | 9/2004 | Philippot | B60N 2/5825 |
| | | | | 297/452.18 |
| 2004/0227389 | A1 * | 11/2004 | Yoshida | B60N 2/4228 |
| | | | | 297/452.18 |
| 2009/0102270 | A1 * | 4/2009 | Wissner | B60N 2/7094 |
| | | | | 297/452.56 |
| 2013/0082504 | A1 * | 4/2013 | Archambault | B60N 2/005 |
| | | | | 297/452.18 X |
| 2014/0084661 | A1 * | 3/2014 | Awata | B60N 2/72 |
| | | | | 297/452.18 |
| 2015/0008716 | A1 * | 1/2015 | Dry | B60N 2/56 |
| | | | | 297/452.18 |
| 2015/0251579 | A1 * | 9/2015 | Line | B60N 2/7005 |
| | | | | 297/452.18 X |
| 2015/0314501 | A1 * | 11/2015 | Maslakow | B60N 2/686 |
| | | | | 297/452.18 |
| 2015/0336490 | A1 * | 11/2015 | Nie | B60N 2/68 |
| | | | | 297/452.18 |
| 2015/0367762 | A1 * | 12/2015 | Yasuda | B60N 2/68 |
| | | | | 297/216.14 |
| 2016/0001689 | A1 * | 1/2016 | Yasuda | B60N 2/4228 |
| | | | | 297/391 |
| 2016/0096450 | A1 * | 4/2016 | Kondrad | B60N 2/20 |
| | | | | 297/285 |
| 2016/0272097 | A1 * | 9/2016 | Szymanski | B60N 2/70 |
| 2017/0283070 | A1 * | 10/2017 | Hall | B60N 2/64 |
| 2017/0334326 | A1 * | 11/2017 | Line | B60N 2/686 |
| 2018/0319301 | A1 * | 11/2018 | Haby | B60N 2/686 |
| 2019/0176665 | A1 * | 6/2019 | Inoue | B60N 2/682 |
| 2019/0210498 | A1 * | 7/2019 | Tsukamoto | B60N 2/68 |
| 2019/0225180 | A1 * | 7/2019 | Kondrad | B60N 2/6018 |
| 2020/0406798 | A1 * | 12/2020 | Singh | B64D 11/064 |
| 2021/0061140 | A1 * | 3/2021 | Nagai | B60N 2/888 |
| 2022/0176856 | A1 * | 6/2022 | Mauffrey | B60N 2/5621 |
| 2022/0340059 | A1 * | 10/2022 | Mitsuoka | B60N 2/686 |
| 2022/0340060 | A1 * | 10/2022 | Mitsuoka | B60N 2/70 |
| 2023/0055017 | A1 * | 2/2023 | Steury | B60N 2/5825 |
| 2023/0302975 | A1 * | 9/2023 | Cluet | B60N 2/686 |
| 2023/0406176 | A1 * | 12/2023 | Haubrich | B60N 2/882 |
| 2023/0406177 | A1 * | 12/2023 | Line | B60N 2/68 |

FOREIGN PATENT DOCUMENTS

| | | | | |
|---|---|---|---|---|
| JP | | 2015199366 A | * 11/2015 | B60N 2/5825 |
| JP | | 2016016847 A | * 2/2016 | B60N 2/5825 |

* cited by examiner

SEAT BACK

CROSS REFERENCE TO RELATED APPLICATIONS

This application is based on Japanese Patent Applications No. 2021-187642 filed on Nov. 18, 2021, the entire contents of which are incorporated herein by reference.

TECHNICAL FIELD

The present disclosure relates to a seat back. Specifically, the present disclosure relates to a seat back that supports a back of a seated person.

BACKGROUND ART

JP-A-2002-142913 discloses a seat back including, on a back thereof, a back board serving as a decorative plate. The above-described seat back includes a pair of upper and lower auxiliary frames that are provided on side frames of a back frame forming an internal skeleton across a seat width direction. The back board is claw-fitted from the rear to each auxiliary frame and attached to the back frame.

SUMMARY OF DISCLOSURE

In the seat back described in JP-A-2002-142913, a peripheral edge of the above-described back board is fitted to a back pad to be assembled to the back frame. Accordingly, when the occupant puts a finger to an end of the back board, there is a concern that the back pad may be pushed away and the finger may enter an inside of the seat back. Therefore, the present disclosure provides a seat back capable of preventing a finger from entering an inside of a seat from an end of a back board.

In order to solve the above-described matters, the seat back according to the present disclosure has the following aspects.

According to an aspect of the disclosure, a seat back includes a back board serving as a decorative plate on a rear side of the seat back, a back frame that is configured to support a seated person, a back pad that is disposed at a front side the back frame, is configured to supports the seated person, and has elasticity, an intermediate board that is interposed between a peripheral edge of the back pad and a peripheral edge of the back board, and a back cover that is disposed over the back pad and the intermediate board.

According to the above-described configuration, the peripheral edge of the back board is fitted to the intermediate board. Therefore, it is possible to prevent a finger from entering an inside without expanding the fitting portion when the finger is hung. Further, the back cover is placed between the intermediate board and the back pad, so that it is possible to prevent the finger from entering the inside.

The seat back according to the present disclosure may be further configured that an end portion of the back cover is disposed between the intermediate board and the back board.

According to the above-described configuration, the end of the back cover may be pulled into the back board and fastened with good appearance.

The seat back according to the present disclosure may be further configured that the intermediate board includes a pair of intermediate board members that are provided on both outer side portions of the back frame in a seat width direction, the intermediate board members are fixed to side frame portions at both sides of the back frame, and the back board is provided over the pair of intermediate board members, and is fixed to at least one of the back frame or the intermediate board members.

According to the above-described configuration, the intermediate boards may prevent a finger from entering the inside from both side edge portions of the back board in the seat width direction.

The seat back according to the present disclosure may be further configured that the back board includes a first coupling portion coupled to the back frame with a first coupling force and second coupling portions coupled to the at least one of the back frame or the intermediate board members with a second coupling force smaller than the first coupling force, and when a given load is applied to the back board from a front side of the seat back, the second coupling portions are decoupled from the at least one of the back frame or the intermediate board members while the first coupling portion are coupled to the back frame.

According to the above-described configuration, the second coupling portions are decoupled from an engaged state, so that the excessive load from the front of the seat may be released. Further, by providing the second coupling portions, it is possible to easily control a position at which the load on the back board is likely to be released.

The seat back according to the present disclosure may be further configured that the first coupling portion is coupled to an upper frame of the back frame, and the second coupling portions are coupled to the intermediate board members at a position lower than a position of the first coupling portion in a horizontal direction of the seat back.

According to the above-described configuration, a coupling state of a portion coupled at a position lower than that of the upper frame of the back board is likely to be released. Accordingly, a load applied to a portion where a body pressure of the seated person is high is likely to be released.

The seat back according to the present disclosure may be further configured that the first coupling portion includes a clip detachably attached to a clip attachment portion of the back board, the clip is inserted into an insertion hole of the back frame from a rear side of the back frame and is locked by snap fitting on both sides of a peripheral edge of the insertion hole in a direction orthogonal to an insertion direction of the clip, each of the second coupling portions includes a claw protruding from the back board, and each of the claw is inserted into a corresponding one of coupling holes of the intermediate board members from the rear side and is locked by snap fitting on one side of a peripheral edge of the coupling hole in a direction orthogonal to an insertion direction of the claw.

According to the above-described configuration, the first coupling portion may be firmly coupled with a simple configuration in which the clip is simply inserted from the rear. Further, the clip is attachable and detachable, so that the back board may be easily removed from the back frame, and maintainability may be improved.

The seat back according to the present disclosure may be further configured that the clip attachment portion is opened upward and configured to accept the clip from above.

According to the above-described configuration, when an excessive load is applied from the front of the seat, the clip is less likely to come off the back board. Further, even if the back board receives a force lifted from below due to the above-described load, it is possible that the clip attachment portion is less likely to come off from the clip.

The seat back according to the present disclosure may be further configured that the intermediate board members extend between the upper frame and a lower frame of the back frame along the side frame, the second coupling portions include an intermediate coupling portion provided below the first coupling portion, and a lower coupling portion provided below the intermediate coupling portion and coupled the intermediate board members with a larger coupling force than a coupling force of the intermediate coupling portion to the intermediate board members, and when a given load is applied to the back board from the front side of the seat back, the intermediate coupling portion is decoupled from at least one of the intermediate board members while the lower coupling portion is coupled to the intermediate board members.

According to the above-described configuration, the intermediate coupling portion, to which the body pressure of the seated person is likely to be strongly applied, is more likely to come off. Accordingly, the load applied to the seated person may be more appropriately released.

The seat back according to the present disclosure may be further configured that the intermediate coupling portions are provided at a plurality of positions arranged in an upper-lower direction.

According to the above-described configuration, an interval between the intermediate coupling portions may be narrowed. Accordingly, it is possible to appropriately couple the back board to a fitting portion with the intermediate board such that a gap is less likely to be formed.

DESCRIPTION OF EMBODIMENTS

Figure 1:
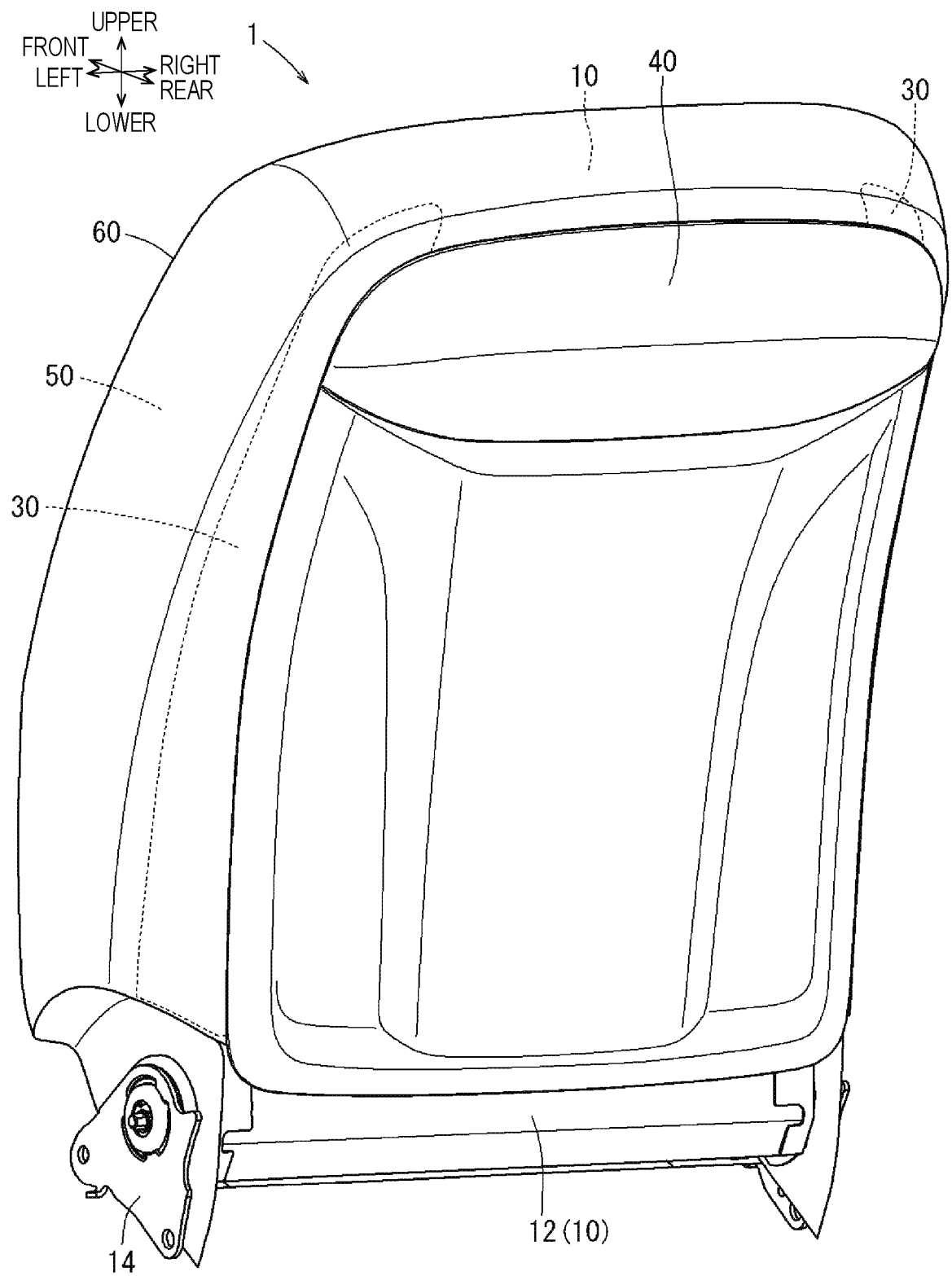
FIG. 1 is a perspective view of a seat back according to a first embodiment.

Hereinafter, embodiments of the present disclosure will be described with reference to FIGS. 1 to 13. In the following description, directions such as front, rear, upper, lower, left, and right indicate directions shown in the drawings.

First Embodiment

Figure 2:
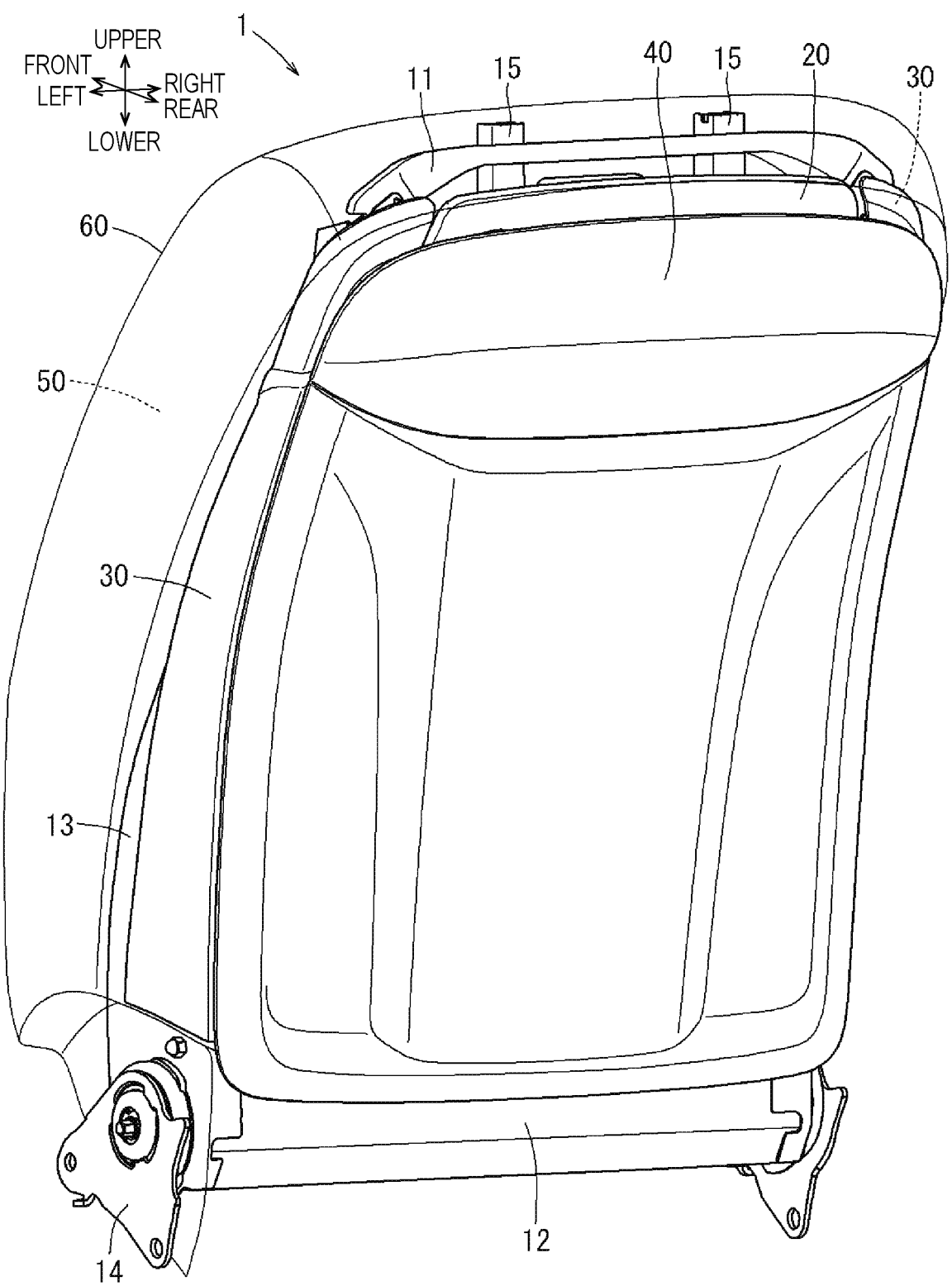
FIG. 2 is a perspective view in which a back cover of the seat back is transparentized.
Figure 3:
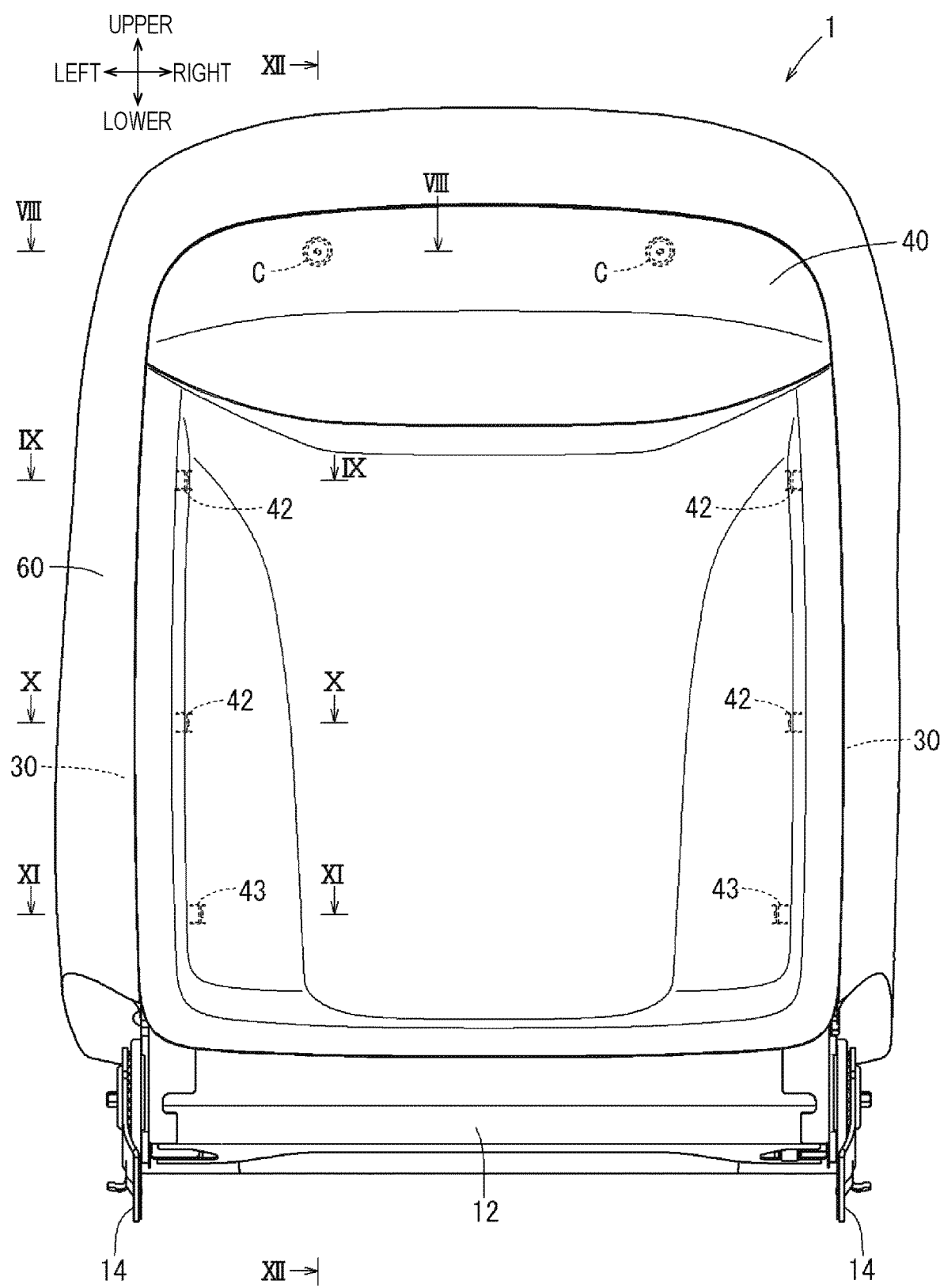
FIG. 3 is a rear view of the seat back.

First, a configuration of a seat back 1 according to a first embodiment of the present disclosure will be described. The seat back 1 according to the present embodiment is implemented as a backrest portion of a seat on which an occupant of an automobile sits. As shown in FIGS. 1 and 2, the seat back 1 includes a frame-shaped back frame 10 that supports a load of a seated person, a back pad 50 that is assembled to a front portion of the back frame 10, a back cover 60 that covers the back pad 50 from the front, and a back board 40 that is assembled to a back portion of the back frame 10. The seat back 1 may elastically support the load of the seated person by the back pad 50. The back board 40 is a decorative plate formed of resin, and has a concave curved shape recessed forward. The back board 40 extends over both outer side portions of the back frame 10 in a seat width direction.

Figure 4:
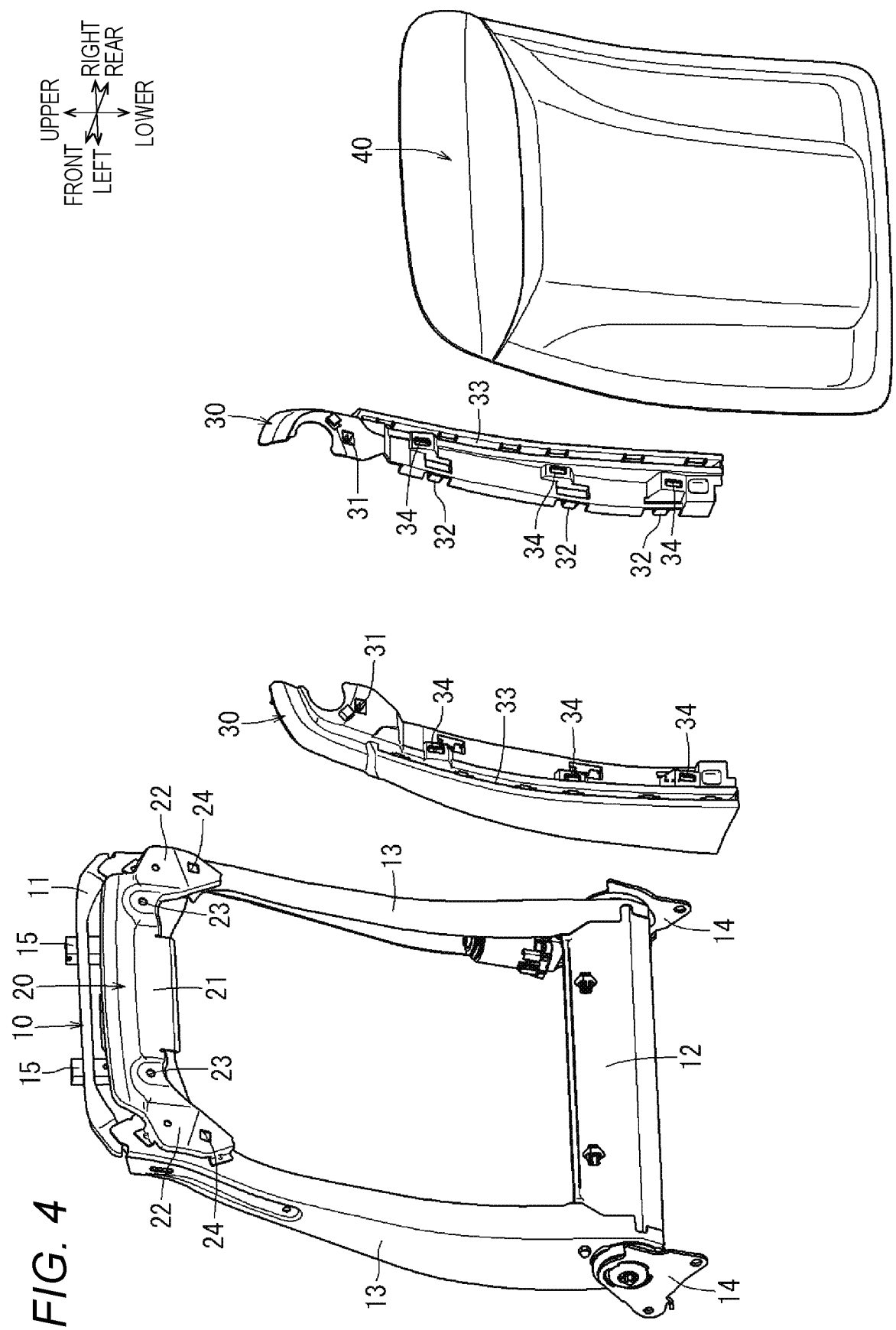
FIG. 4 is an exploded perspective view of a back frame, a side board, and a back board.

As shown in FIGS. 2 and 4, the seat back 1 includes a pair of left and right side boards that are assembled to both left and right side portions of the back frame 10 from the rear, and that are fitted to both left and right end portions of the back board 40 from the front. Each of the side boards 30 is a vertical plate-shaped member elongated in a height direction along a respective one of the side portions of the back frame 10. Each of the side boards 30 is formed of resin and has a U-shaped cross section that opens forward as viewed from above (see FIGS. 9 to 11). Each of the side boards 30 protrudes outward from a respective one of the side portions of the back frame 10 in the seat width direction. A front surface portion of each of the side boards 30 supports, from the rear, each rear end portion of the back pad 50 covering both side surface portions of the back frame 10 from an outside in the seat width direction.

As described above, the front surface portion of each of the side boards 30 abuts against the back pad 50, and a rear surface portion of each of the side boards 30 is fitted to the back board 40. That is, each of the side boards 30 is sandwiched between the left and right end portions of the back board 40 and the rear end portions on the left and right of the back pad 50 in a front-rear direction. Then, the back cover 60 is placed over each of the side boards 30 from the front of a seat, and covers the back pad 50 and an abutting portion between the back pad 50 and each of the side boards 30 from the outside. An end of the back cover 60 is pulled into the inside from a gap between each of the side boards 30 and the back cover 60 and is fastened. The back cover 60 prevents a finger from entering the abutting portion between each of the side boards 30 and the back pad 50.

A fitting portion between each of the side boards 30 and the back board 40 is implemented as a fitting portion at which solid objects are fitted to each other. Accordingly, unlike a configuration in which the back board 40 and the back pad 50 are directly fitted to each other, when the finger of the occupant is put on the fitting portion between the back board 40 and each of the side boards 30, it is possible to prevent the finger from entering the inside of the back board 40 without widening the gap of the above-described fitting portion. Here, the side board 30 corresponds to an "intermediate board" according to the present disclosure.

<Back Frame 10>

Hereinafter, a specific configuration of the seat back 1 will be described. The back frame 10 is formed of metal. The back frame 10 includes vertically long plate-shaped side frames 13 that form side skeletons on both the left and right, a horizontally long plate-shaped upper frame 11 that extends between upper portions of the side frames 13, and a horizontally long plate-shaped lower frame 12 that extends between lower portions of the side frames 13. Each of the side frames 13 includes a reclining plate 14 connected to a seat cushion (not shown) on both left and right outer sides of a lower portion of the side frame 13. The upper frame 11 forms an upper skeleton and has a U-shaped cross section that opens rearward in a side view (see FIG. 12). A headrest (not shown) serving as a headrest portion for the seated person is attached to an upper portion of the seat back 1, and the upper frame 11 includes, on an upper surface thereof, two holders 15 that are arranged in the seat width direction and into which a headrest stay (not shown) is inserted from above (see FIG. 2).

<Bracket 20>

As shown in FIG. 4, the back frame 10 includes a bracket 20 that is welded over each of the side frames 13 in a manner of covering the U-shaped opening of the upper frame 11 from the rear. The bracket 20 includes a horizontally long plate-shaped covering portion 21 provided behind the upper frame 11, and welded portions 22 that extend from both left and right ends of the covering portion 21 and that are welded to upper portions of the side frames 13. The bracket 20 is integrally formed with the back frame 10 by a part of a peripheral edge of each of the welded portions 22 being welded to a respective one of the side frames 13.

The bracket 20 has circular insertion holes 23 formed at two symmetrical positions on the left and right of the covering portion 21, and rectangular locking holes 24 formed at lower portions of the welded portions 22. An upper portion of the back board 40 is coupled to the insertion holes 23 by clips C (see FIGS. 5 and 6) to be described later. Each of the insertion holes 23 is formed in a portion that protrudes in a convex shape toward the rear of the covering portion 21. Accordingly, the clips C are easily inserted into the insertion holes 23. Upper portions of the side boards 30 are coupled to the locking holes 24 by hooks 31 (see FIG. 5).

<Side Board 30>

Figure 5:
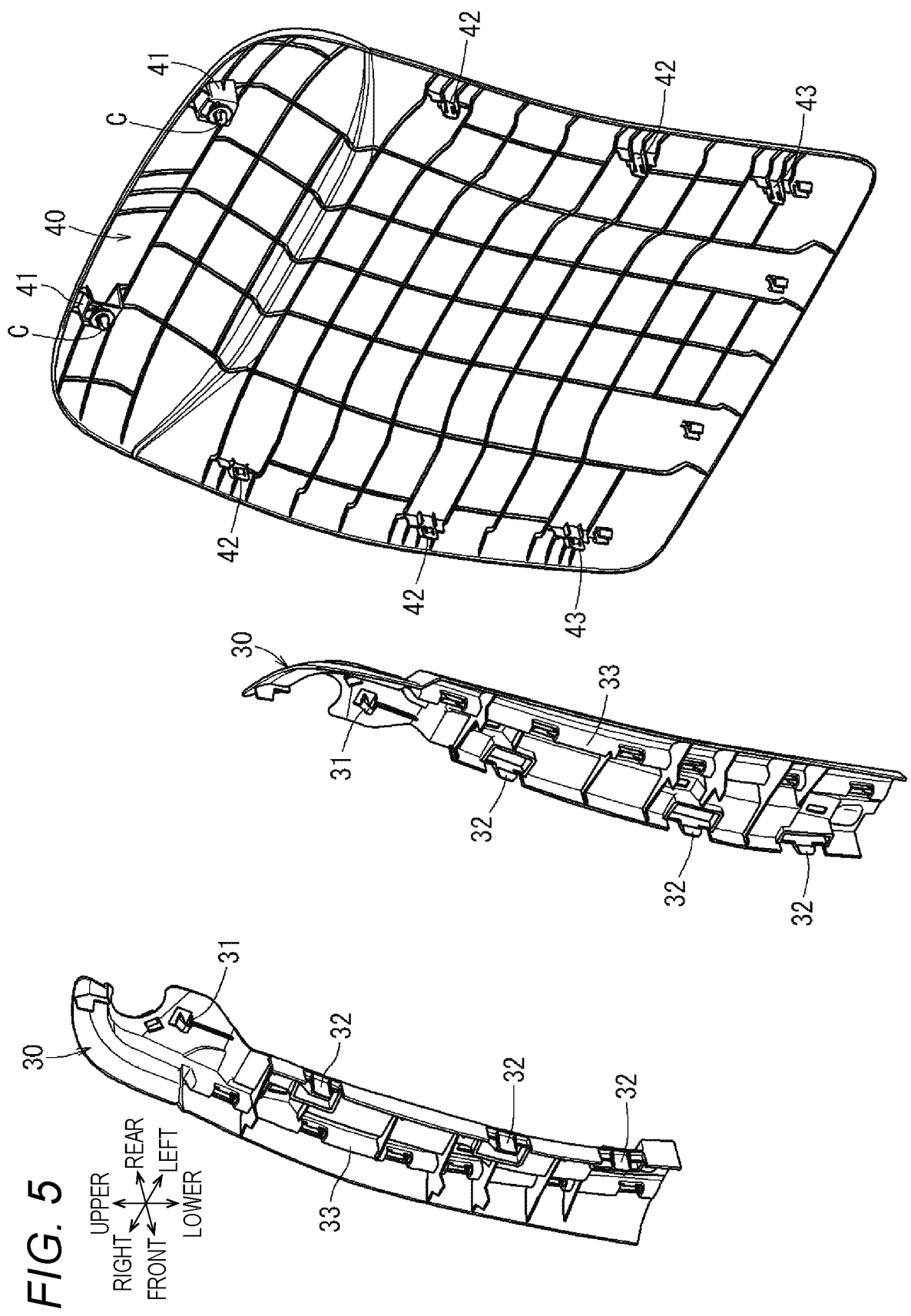
FIG. 5 is an exploded perspective view of the side board and the back board as viewed from the front.

Basic structures of the side boards 30 are symmetrical to each other. Therefore, hereinafter, the configuration of the side board 30 provided on the left shown in FIGS. 4, 5, and 7 will be described as a representative of the side boards 30. As shown in FIG. 5, the side board 30 includes a hook 31 protruding forward from an upper region of the front surface portion of the side board 30, and three claws 32 formed on an inner surface portion of the hook 31. Each of the claws 32 has a shape extending forward from the above-described inner surface portion and protruding outward in the seat width direction.

The hook 31 has a shape extending from the front surface portion of the side board into a substantially J shape in a lateral direction in a side view. The hook 31 is inserted into the locking hole 24 on the left of the bracket 20 from the rear, so that the hook 31 is snap-fitted to the locking hole 24 in a state of being retained in the locking hole 24. The three claws 32 are arranged at intervals in a height direction from a middle portion to a lower portion of the side board 30 in the height direction. Each of the claws 32 is locked to an inner edge of a rear edge portion that is bent inward of each of the side frames 13 in the seat width direction. As described above, each of the side boards 30 may be appropriately locked to a respective one of the side frames 13 so as not to form a gap over a wide range in the height direction. The side board 30 is assembled to the back frame 10 by the hooks 31 and the claws 32 described above.

As shown in FIG. 4, the side board 30 includes a fastening portion 33 to which the end of the back cover 60 is fastened to a back surface portion of the side board 30, and three rectangular coupling holes 34 to which a left end portion of the back board 40 is claw-fitted from the rear. The three coupling holes 34 are arranged at intervals in the height direction from the middle portion to the lower portion of the side board 30 in the height direction. Each of the coupling holes 34 is formed in a portion that protrudes in a convex shape toward the rear of the back board 40. Accordingly, the back board 40 is easily claw-fitted to the coupling holes 34. The fastening portion 33 is a concave portion extending along the height direction of the side board 30, and is opened forward. The fastening portion 33 is formed on an outer side with respect to each of the coupling holes 34 in the seat width direction.

Figure 9:
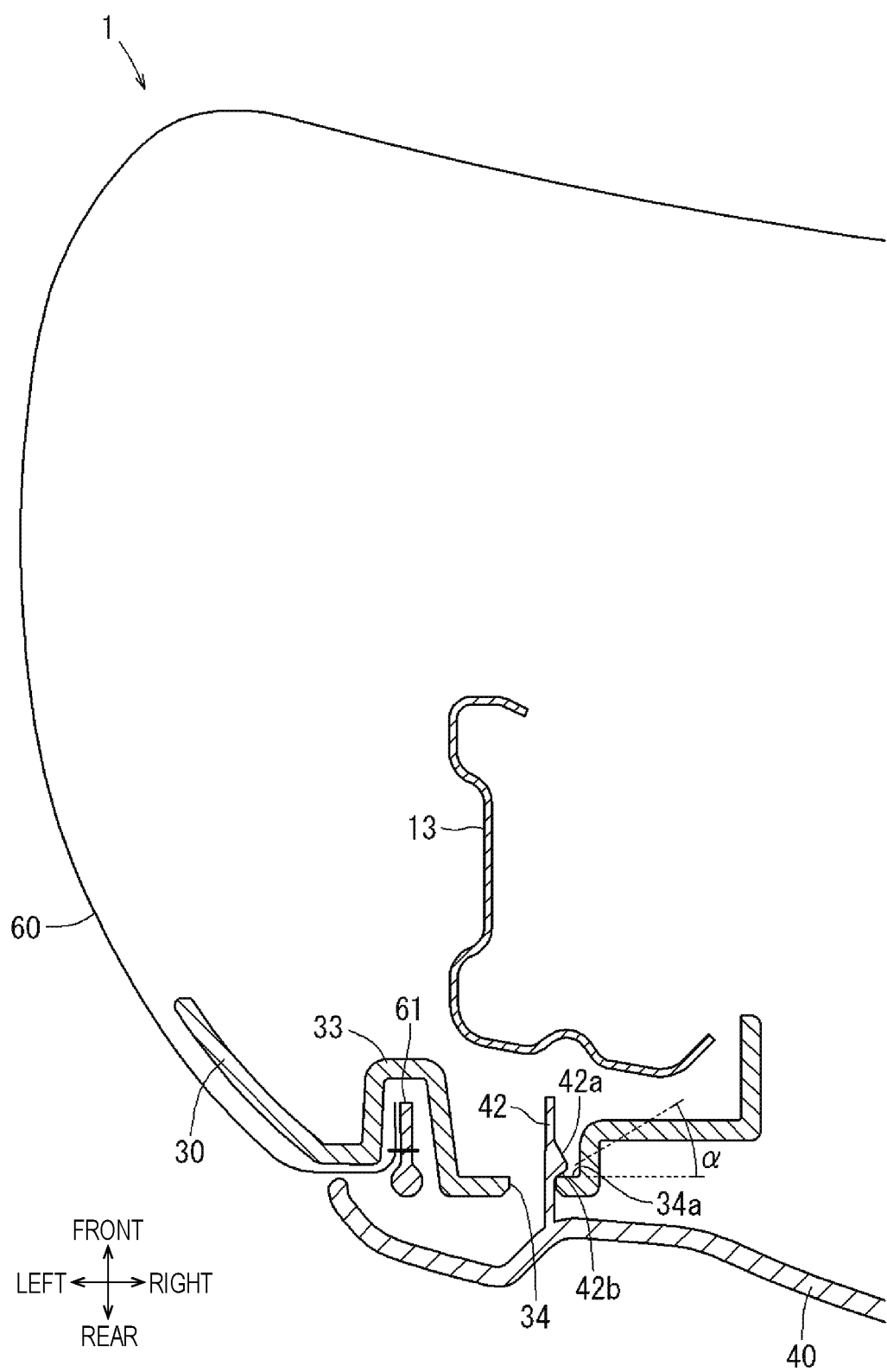
FIG. 9 is a cross-sectional view taken along a line IX-IX in FIG. 3.

As shown in FIG. 9, the end of the back cover 60 is placed along an outer surface portion of the side board 30. The placed end of the back cover 60 is fastened to the back surface portion of the side board 30 by inserting a resin bead edge 61, which is sewn in a manner of extending in a long shape along a tip of the end of the back cover 60, into the fastening portion 33. Accordingly, the end of the back cover 60 is fixed in a state of being pulled into a back surface side of the side board 30. The fastening portion 33 is covered from the rear by the back board 40 by assembling the back board 40 to each of the side boards 30 from the rear. Accordingly, the end of the back cover 60 is pulled inward from the gap between the side board and the back board 40. Accordingly, the end of the back cover 60 may be fastened to the fastening portions 33 with good appearance.

<Back Board 40>

Figure 6:
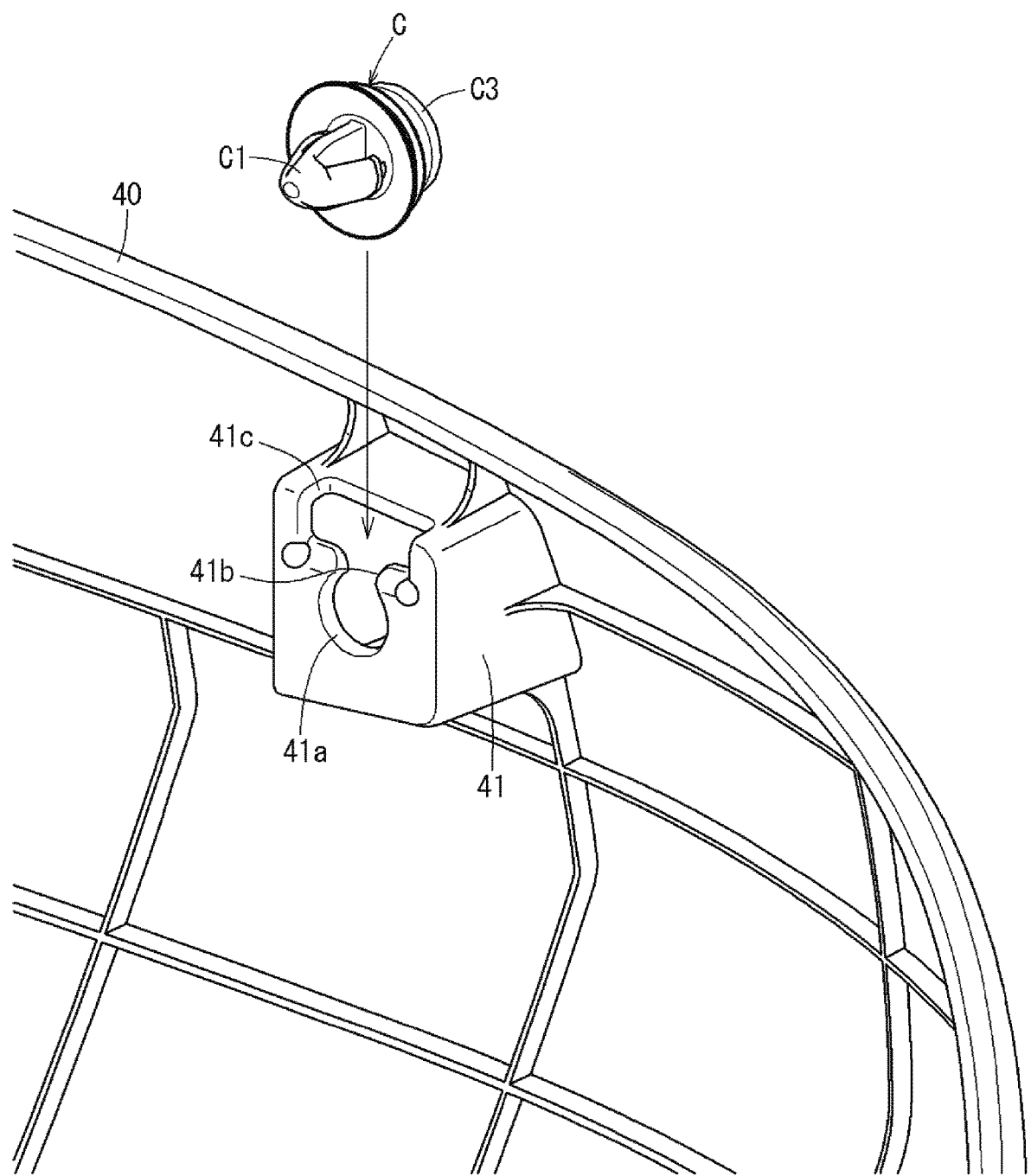
FIG. 6 is an enlarged perspective view of a clip attachment portion in FIG. 5.
Figure 7:
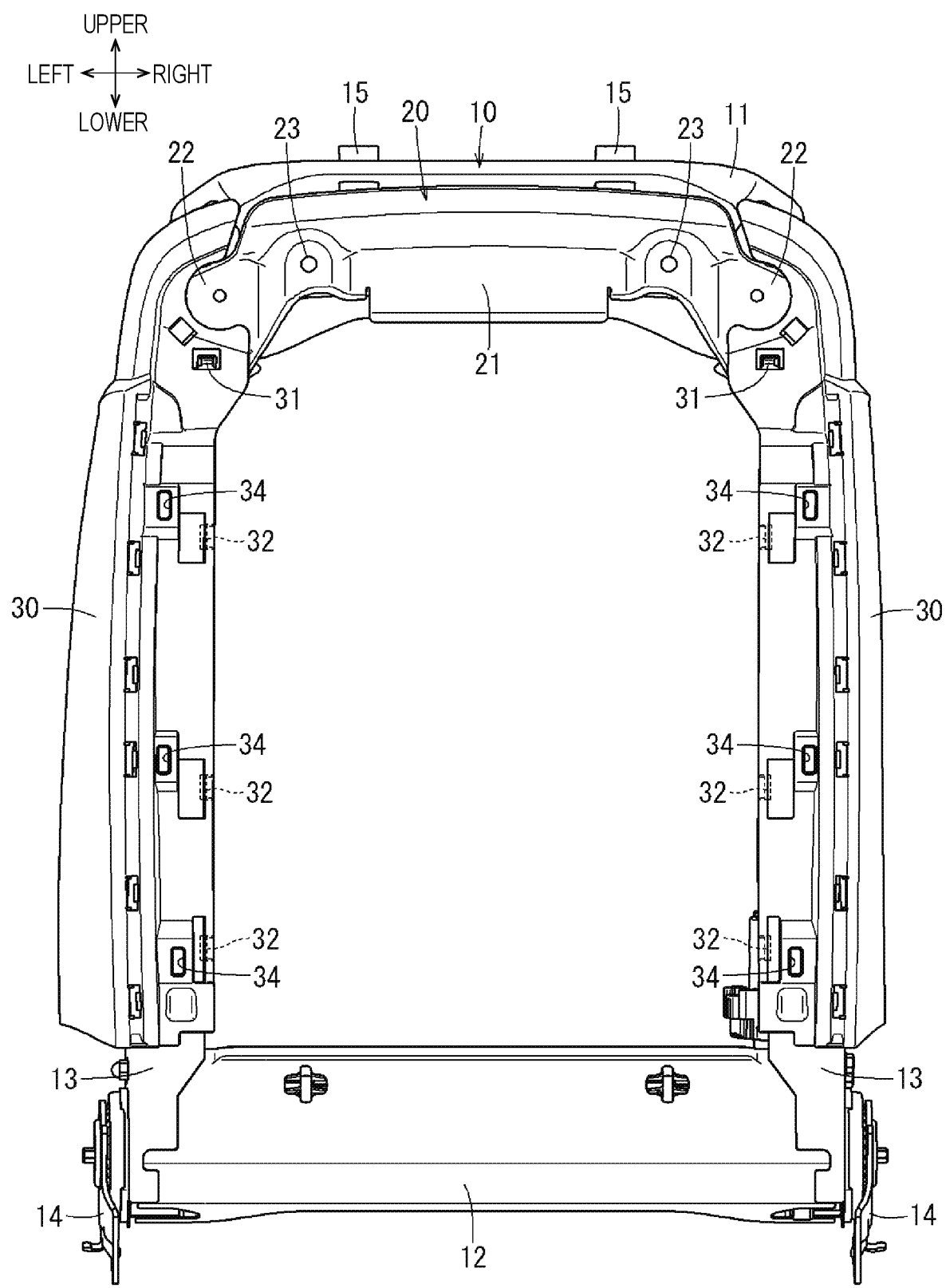
FIG. 7 is a rear view of the seat back from which the back board is removed.

As shown in FIG. 5, the back board 40 includes a clip attachment portion 41 to which the clip C to be inserted into the above-described bracket 20 from the rear is detachably attached, and an intermediate coupling portion 42 and a lower coupling portion 43 that are coupled to the side boards 30. As shown in FIG. 5, two clip attachment portions 41 are arranged at an interval along an upper edge portion of the back board 40 in the left-right direction. As shown in FIG. 6, the clip attachment portion 41 has a hollow box shape protruding forward from a front surface portion of the back board 40. Each of the clip attachment portions 41 includes a round hole-shaped fitting hole 41a penetrating at a center of the front face portion of the clip attachment portion 41 in the front-rear direction, an opening 41c extending from the fitting hole 41a in a manner of opening the fitting hole 41a upward, and a narrowing portion 41b that narrows a hole width of a boundary portion between the fitting hole 41a and the opening 41c in the left-right direction.

Figure 8:
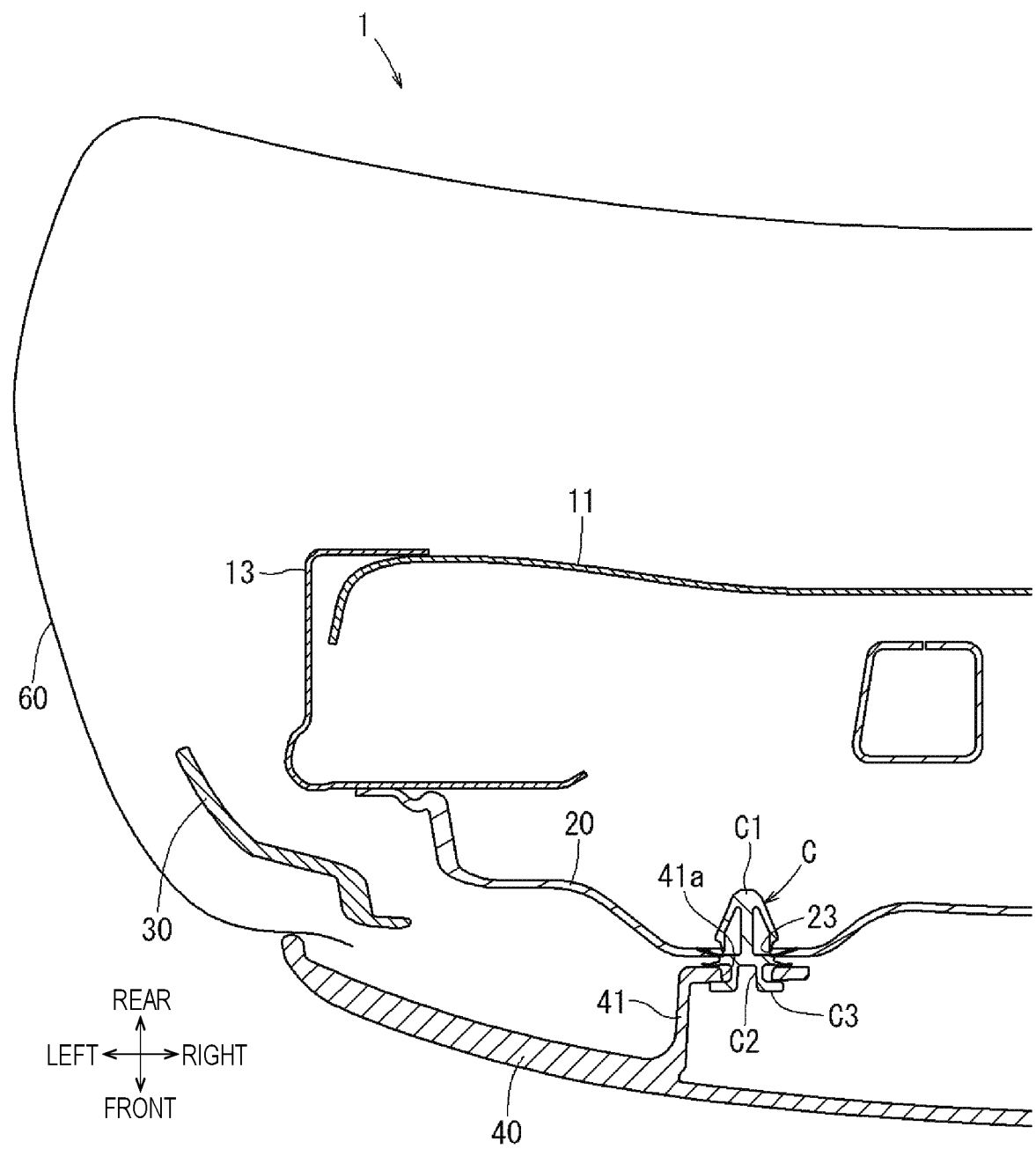
FIG. 8 is a cross-sectional view taken along a line VIII-VIII in FIG. 3.
Figure 13:
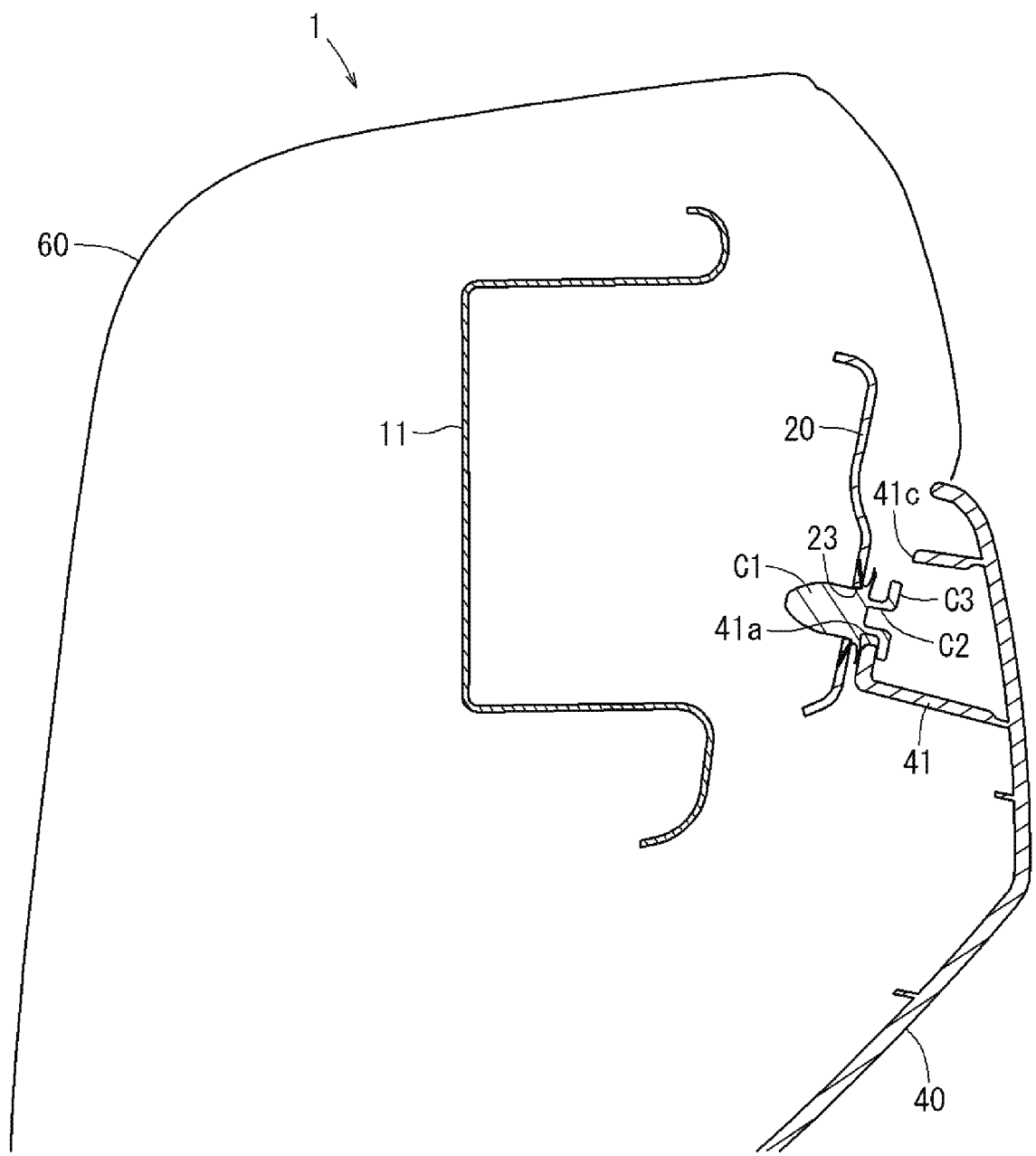
FIG. 13 is an enlarged cross-sectional view of an attachment structure of a clip in FIG. 12.

As shown in FIGS. 8 and 13, the clip C includes an iron-shaped insertion portion C1, a cylindrical fitting shaft C2 that is formed at a center of a base end of the insertion portion C1 and that extends in an axial direction, and a seat surface portion C3 protruding in a flange shape from an end portion of the fitting shaft C2. The fitting shaft C2 is wider than the narrowing portion 41b of the clip attachment portion 41 in a radial direction. As shown in FIG. 6, the clip C is assembled such that the fitting shaft C2 is inserted into the fitting hole 41a of the clip attachment portion 41 from above in a state in which the insertion portion C1 faces forward. Accordingly, the fitting shaft C2 is fitted into the fitting hole 41a while elastically pressing and spreading the narrowing portion 41b, and is set in a state in which a peripheral edge of the fitting hole 41a is sandwiched between the base end of the insertion portion C1 and the seat surface portion C3 in the front-rear direction.

As shown in FIG. 13, the insertion portion C1 of the clip C attached to the clip attachment portion 41 is inserted into the insertion hole 23 of the bracket 20 obliquely upward from the rear. Accordingly, as shown in FIG. 8, both side portions of the inserted insertion portion C1 in the left-right direction are snap-fitted to a peripheral edge of the insertion hole 23. Accordingly, the insertion portion C1 generates a strong coupling force with respect to the insertion hole 23 and is prevented from coming off. In this way, by simply inserting the clip C into the insertion hole 23 from the rear, the upper portion of the back board 40 is assembled to the bracket 20. The clip C is attachable to and detachable from the clip attachment portion 41. Accordingly, even after the clip C has been inserted into the bracket 20, the back board may be easily removed from the bracket 20 with the clip C left. Accordingly, maintainability of the back board 40 may be improved. Here, the clip C corresponds to a "first coupling portion" according to the present disclosure.

As shown in FIG. 5, the intermediate coupling portion 42 is a rib-shaped member that is elongated in the height direction and that protrudes forward from the front surface portion of the back board 40. The two intermediate coupling portions 42 are arranged at an interval in the height direction on the left and right of the back board 40. Each of the intermediate coupling portions 42 is provided in an intermediate region of the back board 40 in the height direction. Each of the intermediate coupling portions 42 includes an intermediate claw 42a protruding inward from an inner surface of the intermediate coupling portion 42 in the seat width direction (see FIGS. 9 and 10). The intermediate coupling portion 42 provided on an upper side is provided at a position that is closer to the upper frame 11 than is the lower frame 12 in the height direction. The intermediate coupling portion 42 provided on a lower side is provided at a position that is closer to the lower frame 12 than is the upper frame 11 in the height direction.

As shown in FIG. 5, the lower coupling portion 43 is a rib-shaped member that is elongated in the height direction and that protrudes forward from the front surface portion of the back board 40. The lower coupling portions 43 are provided on the left and right of the back board 40 in a manner of being located below the intermediate coupling portions 42. Each of the lower coupling portions 43 includes a lower claw 43a protruding inward from an inner surface of the lower coupling portion 43 in the seat width direction (see FIG. 11).

Figure 10:
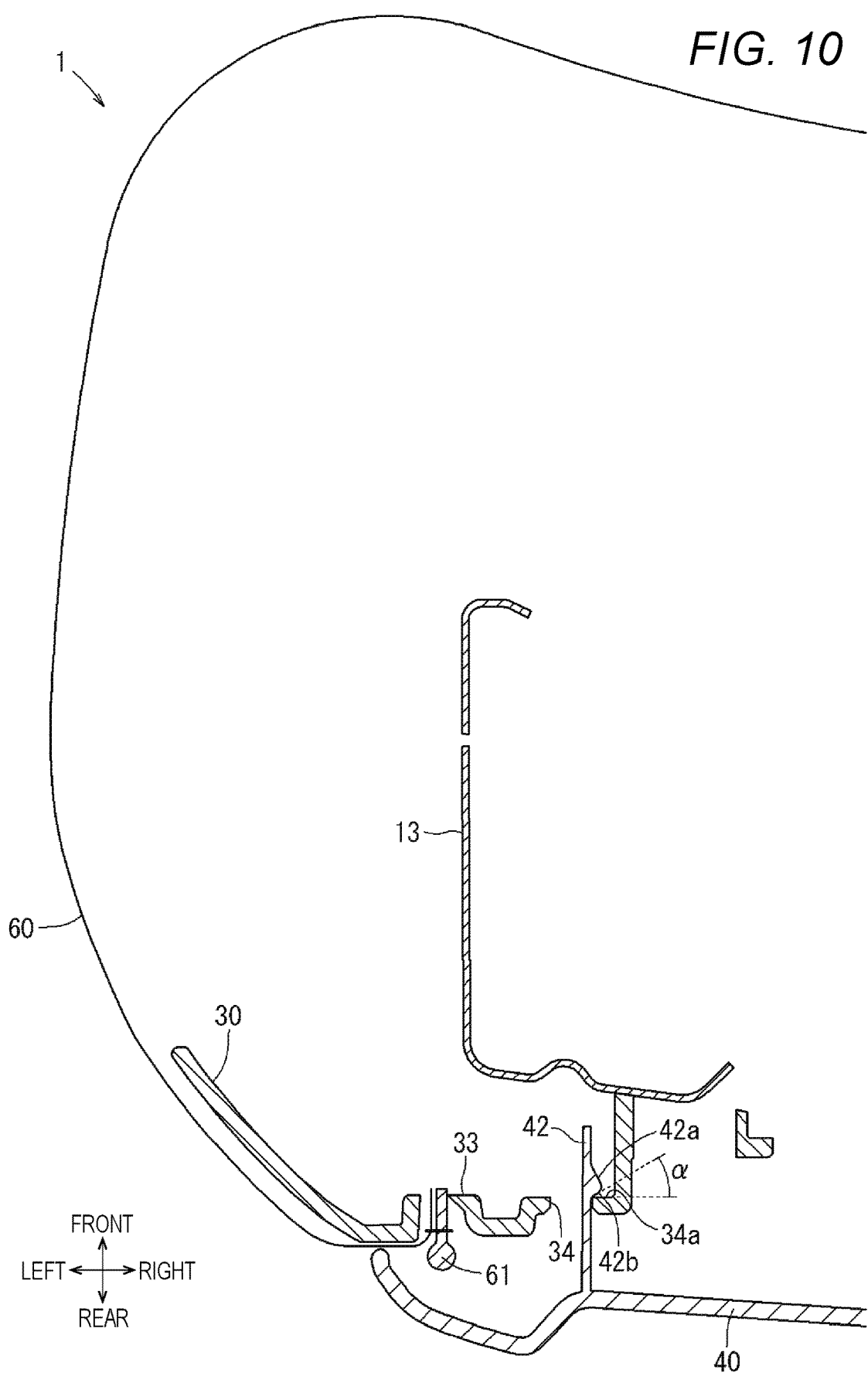
FIG. 10 is a cross-sectional view taken along a line X-X in FIG. 3.
Figure 11:
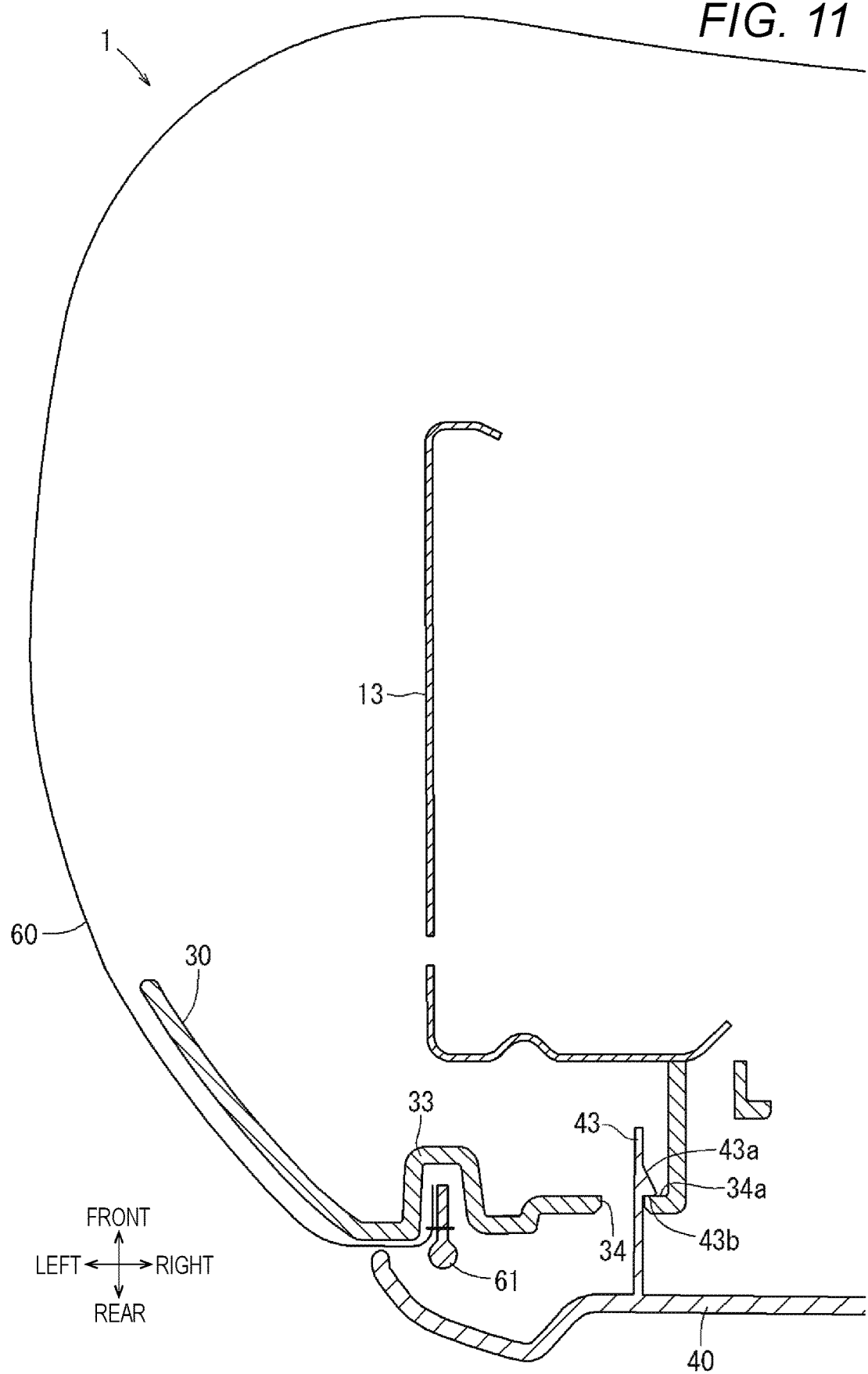
FIG. 11 is a cross-sectional view taken along a line XI-XI in FIG. 3.
Figure 12:
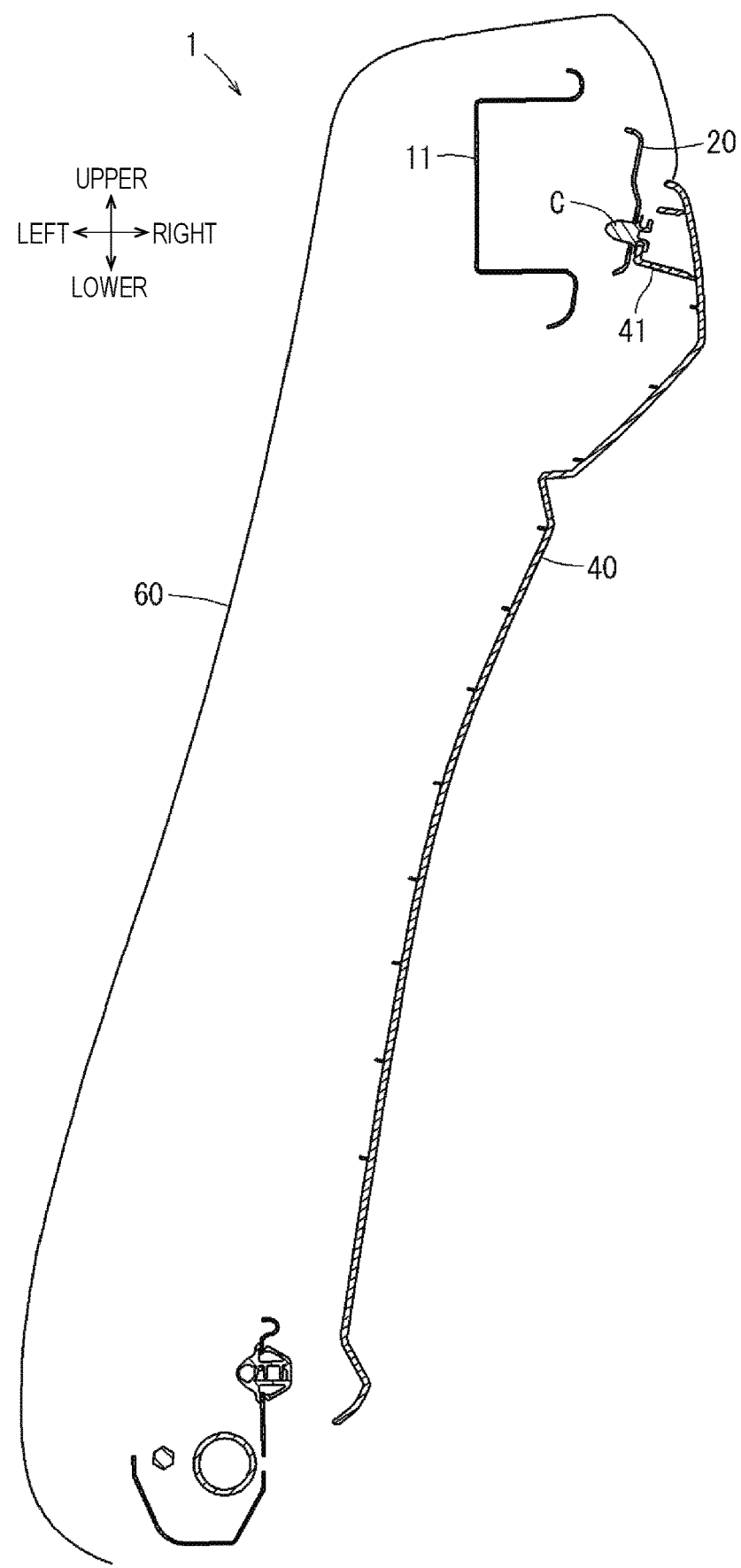
FIG. 12 is a cross-sectional view taken along a line XII-XII in FIG. 3.

As shown in FIG. 4, the intermediate coupling portions 42 and the lower coupling portions 43 are inserted into and coupled to the coupling holes 34 of the side boards 30 from the rear. As shown in FIGS. 9 and 10, the intermediate claw 42a of the inserted intermediate coupling portion 42 is locked to an inner edge of the coupling hole 34. In the intermediate claw 42a, a locking surface 42b that abuts against a peripheral edge of the coupling hole 34 is inclined in a manner of extending obliquely forward with respect to a locked abutting surface 34a of the coupling hole 34. As shown in FIGS. 9 and 10, an angle α between the locking surface 42b and the abutting surface 34a in the present embodiment is set to an angle of approximately 30 degrees. As shown in FIG. 11, the lower claw 43a of the inserted lower coupling portion 43 is locked to the inner edge of the coupling hole 34. The lower claw 43a has a configuration in which the locking surface 43b abutting against the peripheral edge of the coupling hole 34 faces and abuts against the abutting surface 34a of the coupling hole 34 straight in the front-rear direction.

The intermediate coupling portions 42 and the lower coupling portions 43 are implemented such that the intermediate claws 42a and the lower claws 43a are locked only on one side in the direction (the left-right direction) orthogonal to an insertion direction with respect to the corresponding coupling holes 34 of the side board 30. Accordingly, as compared with the clips C that are locked on both sides of the insertion holes 23 of the bracket 20 in the direction (the left-right direction) orthogonal to the insertion direction, coupling forces of the intermediate coupling portions 42 and the lower coupling portions 43 are small. Further, the intermediate coupling portions 42 are inclined to the locking surface 42b of the intermediate claw 42a, so that the coupling forces of the intermediate coupling portions 42 are smaller than those of the lower coupling portions 43. Here, the intermediate coupling portion 42 and the lower coupling portion 43 correspond to a "second coupling portion" according to the present disclosure.

According to the above-described configuration, for example, when the seat back 1 receives a strong load from the seated person due to a rear collision of the automobile, the intermediate coupling portions 42 are decoupled from the side boards 30. Specifically, when the above-described load is applied, an intermediate region of the back board 40 in the height direction receives a relatively high body pressure action from a vicinity of a waist of the seated person. At the intermediate coupling portions 42, the above-described intermediate region of the back board 40 is coupled to the side boards 30. Therefore, the load applied to the vicinity of the waist of the seated person may be appropriately released by decoupling the intermediate coupling portions 42. When a larger load is applied, not only the intermediate coupling portions 42 but also the lower coupling portions 43 are decoupled from the side boards 30. Accordingly, it is possible to release a load in a wide region from the vicinity of the waist of the seated person to a vicinity of buttocks of the seated person.

On the other hand, the clips C having large coupling forces do not come off from the bracket 20 even if the clips C receive the above-described load. Accordingly, the back board is not completely decoupled from the back frame 10, and there is no concern that the back board 40 falls out rearward. Even if the back board 40 receives a large load toward the rear due to the above-described rear collision, as shown in FIG. 13, the fitting holes 41a of the clip attachment portions 41 are supported by the insertion portions C1 and the seat surface portions C3 in a state of being prevented from coming off in the front-rear direction. Accordingly, it is possible to prevent the coupling of the clip attachment portions 41 and the clips C from being decoupled.

Even if the back board 40 receives a large force lifted from below due to the rear collision, the back board 40 is prevented from being decoupled upward from the clips C. Specifically, as shown in FIG. 6, the clips C are attached to the clip attachment portions 41 from above. Accordingly, lower edges of the fitting holes 41a are pressed against the clips C even if the back board 40 is lifted. Accordingly, it is possible to cause the upper portion of the back board 40 to be less likely to come off due to the above-described lifting force.

In summary, the seat back 1 according to the first embodiment has the following configuration. In the following description, reference signs in parentheses correspond to the configurations shown in the above-described embodiment.

That is, a seat back (1) according to the first embodiment includes, on a back thereof, a back board (40) serving as a decorative plate. The seat back (1) includes: a back frame (10) that is configured to support a load of a seated person; a back pad (50) that is disposed at a front side of the back frame (10), is configured to support a load of a seated person and has elasticity; an intermediate board (30) that is interposed at a fitting portion of a peripheral edge between the back pad (50) and the back board (40); and a back cover (60) that is placed over the back pad (50) and the intermediate board (30).

According to this configuration, the peripheral edge of the back board (40) is fitted to the intermediate board (30). Therefore, it is possible to prevent a finger from entering an inside without expanding the fitting portion when the finger is hung. Further, the back cover (60) is placed between the intermediate board (30) and the back pad (50), so that it is possible to prevent the finger from entering the inside.

An end of the back cover (60) is pulled between the intermediate board (30) and the back board (40).

According to this configuration, the end of the back cover (60) may be pulled into the back board (40) and fastened with good appearance.

A pair of the intermediate boards (30) are provided on both outer side portions of the back frame (10) in a seat width direction, and are fixed to side frames (13) on both side portions of the back frame (10). The back board (40) is disposed over the pair of intermediate boards (30), and is fixed to the back frame (10) and/or the pair of intermediate boards (30).

According to this configuration, the intermediate boards (30) may prevent a finger from entering the inside from both side edge portions of the back board (40) in the seat width direction.

Further, the back board (40) includes a first coupling portion (C) to be coupled to the back frame (10) and second coupling portions (42, 43) to be coupled to the back frame (10) and/or the intermediate boards (30) with a smaller coupling force than the first coupling portion (C). When an excessive load is applied to the back board (40) from the front of a seat, the second coupling portions (42, 43) are decoupled from a coupled state before the first coupling portion (C).

According to this configuration, the second coupling portions (42, 43) are decoupled from an engaged state, so that the excessive load from the front of the seat may be released. Further, by providing the second coupling portions (42, 43), it is possible to easily control a position at which the load on the back board (40) is likely to be released.

The first coupling portion (C) is coupled to an upper frame (11) of the back frame (10), and the second coupling portions (42, 43) are coupled to the pair of intermediate boards (30) at a position lower than that of the first coupling portion (C).

According to this configuration, a coupling state of a portion coupled at a position lower than that of the upper frame (11) of the back board (40) is likely to be released. Accordingly, a load applied to a portion where a body pressure of the seated person is high is likely to be released.

The first coupling portion (C) is implemented such that a clip (C) detachably attached to a clip attachment portion (41) of the back board (40) is inserted into an insertion hole of the back frame (10) from the rear and is locked by snap fitting on both sides of a peripheral edge of the insertion hole in a direction orthogonal to an insertion direction. The second coupling portions (42, 43) are implemented such that a claw protruding from the back board (40) is inserted into a coupling hole of the intermediate board (30) from the rear and is locked by snap fitting only on one side of a peripheral edge of the coupling hole in a direction orthogonal to an insertion direction.

According to this configuration, the first coupling portion (C) may be firmly coupled with a simple configuration in which the clip (C) is simply inserted from the rear. Further, the clip (C) is attachable and detachable, so that the back board (40) may be easily removed from the back frame (10), and maintainability may be improved.

The clip attachment portion (41) is opened upward so that the clip (C) may be fitted from above.

According to this configuration, when an excessive load is applied from the front of the seat, the clip (C) is less likely to come off the back board (40). Further, even if the back board (40) receives a force lifted from below due to the above-described load, it is possible that the clip attachment portion (41) is less likely to come off from the clip (C).

The intermediate board (30) extends between the upper frame (11) and a lower frame (12) of the back frame (10) along the side frame (13). The second coupling portions (42, 43) include an intermediate coupling portion (42) provided below the first coupling portion (C), and a lower coupling portion (43) that is provided below the intermediate coupling portion (42) and that is coupled with a larger coupling force than the intermediate coupling portion (42). When an excessive load is applied to the back board (40) from the front of a seat, the intermediate coupling portion (42) is decoupled from a coupled state before the lower coupling portion (43).

According to this configuration, the intermediate coupling portion (42), to which the body pressure of the seated person is likely to be strongly applied, is more likely to come off. Accordingly, the load applied to the seated person may be more appropriately released.

The intermediate coupling portions (42) are provided at a plurality of positions in an upper-lower direction.

According to this configuration, an interval between the intermediate coupling portions (42) may be narrowed. Accordingly, it is possible to appropriately couple the back board (40) to a fitting portion with the intermediate board (30) such that a gap is less likely to be formed.

Other Embodiments

Although the present disclosure has been described using one embodiment, the present disclosure may be implemented in various forms in addition to the above-described embodiment.

1. The seat back may also be widely applied to a seat provided for a vehicle other than an automobile such as a railway, or various vehicles such as an aircraft and a ship.
2. The intermediate board may be an upper board that covers the upper frame from the rear in addition to the side board that covers the side frame from the rear. Alternatively, the intermediate board may continuously cover the side frame and the upper frame from the rear. Alternatively, the intermediate board may be a single plate member provided continuously over the pair of left and right side frames. In addition to a configuration of the pair of left and right side boards, the side board may be provided on only one side of the left and right.
3. The back board may be fixed only to the back frame or may be fixed only to the pair of intermediate boards. The first coupling portion may couple the back board to the back frame with a screw or a bolt, in addition to the clip. The first coupling portion may be coupled to the side frame or the lower frame of the back frame. The first coupling portion may be coupled to the intermediate board. The second coupling portion may be coupled at a position higher than that of the first coupling portion. The second coupling portion may be coupled to the back frame.
4. The intermediate coupling portion may be provided at only one position in the upper-lower direction, or may be provided at three or more positions. The intermediate claw of the intermediate coupling portion may be inclined at an angle smaller than 30 degrees with respect to the abutting surface of the coupling hole. Further, as long as the intermediate claw may be locked to the coupling hole, the intermediate claw may be inclined at a larger angle. The lower coupling portions may be provided at a plurality of positions in the upper-lower direction.

5. The back cover may be placed over the back board.
6. The clip may be attached in a manner of not being attachable to and detachable from the back board. The clip may be attached to the clip attachment portion in the left-right direction or from below.

What is claimed is:

1. A seat back comprising:
a back board serving as a decorative plate on a rear side of the seat back;
a back frame that is configured to support a seated person;
a back pad that is disposed at a front side of the back frame, is configured to support the seated person, and has elasticity;
an intermediate board that is interposed between a peripheral edge of the back pad and a peripheral edge of the back board; and
a back cover that is disposed over the back pad and the intermediate board,
wherein the intermediate board includes a pair of intermediate board members that are separately provided on both outer side portions of the back frame in a seat width direction,
wherein the intermediate board members are fixed to side frame portions at both sides of the back frame,
wherein the back board is provided over the pair of intermediate board members, and is fixed to at least one of the back frame or the intermediate board members,
wherein the back board includes:
  a first coupling portion coupled to the back frame with a first coupling force; and
  second coupling portions coupled to the at least one of the back frame or the intermediate board members with a second coupling force smaller than the first coupling force, and
wherein, when a given load is applied to the back board from a front side of the seat back, the second coupling portions are decoupled from the at least one of the back frame or the intermediate board members while the first coupling portion are coupled to the back frame.

2. The seat back according to claim 1,
wherein an end portion of the back cover is disposed between the intermediate board and the back board.

3. The seat back according to claim 1,
wherein the first coupling portion is coupled to an upper frame of the back frame, and
wherein the second coupling portions are coupled to the intermediate board members at a position lower than a position of the first coupling portion in a horizontal direction of the seat back.

4. The seat back according to claim 3,
wherein the first coupling portion includes a clip detachably attached to a clip attachment portion of the back board,
wherein the clip is inserted into an insertion hole of the back frame from a rear side of the back frame and is locked by snap fitting on both sides of a peripheral edge of the insertion hole in a direction orthogonal to an insertion direction of the clip,
wherein each of the second coupling portions includes a claw protruding from the back board, and
wherein each of the claw is inserted into a corresponding one of coupling holes of the intermediate board members from the rear side and is locked by snap fitting on one side of a peripheral edge of the coupling hole in a direction orthogonal to an insertion direction of the claw.

5. The seat back according to claim 4,
wherein the clip attachment portion is opened upward and configured to accept the clip from above.

6. The seat back according to claim 3,
wherein the intermediate board members extend between the upper frame and a lower frame of the back frame along the side frame,
wherein the second coupling portions include:
  an intermediate coupling portion provided below the first coupling portion; and
  a lower coupling portion provided below the intermediate coupling portion and coupled to the intermediate board members with a larger coupling force than a coupling force of the intermediate coupling portion to the intermediate board members, and
wherein, when a given load is applied to the back board from the front side of the seat back, the intermediate coupling portion is decoupled from at least one of the intermediate board members while the lower coupling portion is coupled to the intermediate board members.

7. The seat back according to claim 6,
wherein the intermediate coupling portion includes a plurality of coupling portions arranged in the horizontal direction.

8. The seat back according to claim 6, wherein the intermediate coupling portion includes an intermediate claw and the lower coupling portion includes a lower claw,
wherein an engaging face of the intermediate claw is inclined with respect to an engaging face of an engaging face of the lower claw.

* * * * *